United States Patent
Seki et al.

(10) Patent No.: US 7,083,407 B2
(45) Date of Patent: Aug. 1, 2006

(54) PREFORM HOLDING JIG FOR BIAXIAL ORIENTATION BLOW MOLDING

(75) Inventors: Nobuichi Seki, Tokyo (JP); Naohito Hara, Tokyo (JP); Masanori Kimura, Tokyo (JP)

(73) Assignee: Yoshino Kogyosho Co., Ltd., Tokyo (JP)

( * ) Notice: Subject to any disclaimer, the term of this patent is extended or adjusted under 35 U.S.C. 154(b) by 246 days.

(21) Appl. No.: 10/480,927

(22) PCT Filed: Dec. 26, 2002

(86) PCT No.: PCT/JP02/13582

§ 371 (c)(1),
(2), (4) Date: Feb. 11, 2004

(87) PCT Pub. No.: WO03/057451

PCT Pub. Date: Jul. 17, 2003

(65) Prior Publication Data

US 2004/0121038 A1   Jun. 24, 2004

(30) Foreign Application Priority Data

Dec. 28, 2001 (JP) .............................. 2001-400264
Jan. 31, 2002 (JP) .............................. 2002-024472
Nov. 29, 2002 (JP) .............................. 2002-349235

(51) Int. Cl.
*B29C 49/48* (2006.01)
(52) U.S. Cl. ..................... 425/534; 425/529; 425/533
(58) Field of Classification Search ............. 425/529, 425/534, 535, 533; 264/537, 538
See application file for complete search history.

(56) References Cited

U.S. PATENT DOCUMENTS

| 5,032,700 A | * | 7/1991 | Sugiyama et al. ........... 219/601 |
| 5,340,302 A | * | 8/1994 | Ingram ....................... 425/529 |
| 5,711,913 A | | 1/1998 | Seki et al. .................. 425/529 |

FOREIGN PATENT DOCUMENTS

| JP | A 58-154415 | | 9/1983 |
| JP | 60062923 U | * | 5/1985 |
| JP | A 63-307928 | | 12/1988 |
| JP | 04059221 A | * | 2/1992 |
| JP | A 7-290562 | | 11/1995 |
| JP | A 9-314650 | | 12/1997 |
| WO | WO 9713632 A1 | * | 4/1997 |

* cited by examiner

*Primary Examiner*—Robert B. Davis
(74) *Attorney, Agent, or Firm*—Oliff & Berridge, PLC

(57) ABSTRACT

A holding jig for such a preform formed of a synthetic resin into a bottomed cylindrical shape as is to be assembled by inserting a mouth cylinder portion to an insertion limit into the leading end portion of a cylindrical jig body having a pin inserting bore formed therethrough at its center for a drawing pin to be inserted thereinto. The holding jig comprises a support portion disposed in the inner circumference of the leading end portion of the jig body at a position to confront a peripheral projecting ridge of the mouth cylinder portion, for making such external contact with the outer circumference of the peripheral projecting ridge as to insert and extract of the mouth cylinder portion, thereby to hold the assembled posture of the preform. The holding jig can hold the preform stably in a predetermined posture thereby to achieve a high productivity for the biaxial orientation blow-molded bottle.

21 Claims, 14 Drawing Sheets (a)

(b)

Related Art

PREFORM HOLDING JIG FOR BIAXIAL ORIENTATION BLOW MOLDING

TECHNICAL FIELD

The present invention relates to a structure for a preform holding jig to be used in a method of biaxial orientation blow molding of a bottle of a synthetic resin.

BACKGROUND ART

Biaxial orientation blow-molded bottle made of a synthetic resin, especially biaxial orientation blow-molded bottle of a polyethylene terephthalate resin are used in many fields and in large numbers as bottle containers, because they exhibit a number of excellent features.

This biaxial orientation blow-molded bottle of a synthetic resin is generally manufactured by biaxially drawing in the axial direction and in the radial direction and blow-molding a preform, which has been injection-molded into a bottomed cylindrical shape, while heating it to a temperature capable of developing the orientation effect.

According to a method of the prior art, as described in JP-A-1995-290562 and shown in FIG. 14, a preform P, which is so held by a holding jig 5 as is loosely fitted in an inverted posture by a guide cylinder member 10 and which is heated to a temperature capable of the drawing effect, is assembled with a blow mold 1 together with the holding jig 5 such that a neck ring P1 formed integrally with and circumferentially of the lower end of the outer circumference of a mouth cylinder portion P2 of the preform P is retained on a neck supporting flanged portion. 3 of the blow mold 1. The preform P is axially drawn and molded in the axial direction by a drawing pin 16, which is inserted into a pin inserting bore 11 formed through in the center of the holding jig 5, and is drawn and molded in the radial direction with the blow air, which is pumped in through the pin inserting bore 11 or the drawing pin 16, so that a bottle P' is molded.

In the method of the prior art described above, the posture of the preform is loosely retained mainly by the guide cylinder member 10.

In JP-A-1997-314650, for example, there is described a double blow molding method. This method includes: the step of biaxial orientation blow molding the preform into a primary intermediate molding; the step of heating and thermally shrinking the primary intermediate molding into a secondary intermediate molding; and the final step of blow molding the secondary intermediate molding into a bottle. The bottle manufactured can have little residual strain and a high heat resistance.

In the method of the prior art, however, especially with the holding jig being detached from the blow mold, the preform is just loosely fitted at its mouth cylinder portion in the holding jig. There arise problems that the posture is broken while the preform is being transferred, to cause production troubles., and that the posture of the secondary intermediate molding being heated during the double blow molding is deflected to cause defective phenomena such as the bite of the mold.

According to the method of the prior art in which the assembled posture of the preform is held by inserting the guide cylinder portion into the mouth cylinder portion of the preform, moreover, that effective sectional area of the inside of the mouth cylinder portion of the preform, which can be utilized as a passage for the blow air, is reduced to raise a problem that it is impossible to achieve the improvement in productivity, which has been intended by increasing the flow rate of blow air to shorten the blow time period.

Just after the blow molding, moreover, there are found many steps of cooling the bottle by an air circulation to blow air into the bottle. These steps are executed mainly through an air passage formed in the drawing pin. However, there is a desire to enlarge the air passage, to increase the air flow rate, to raise the cooling efficiency thereby to improve the productivity better. The reduction in the effective sectional area of the mouth cylinder portion also raises a problem against those demands.

Therefore, the present invention has been conceived to solve the aforementioned problems of the prior art, and has a technical object to hold a preform stably in an assembled posture thereby to achieve a safe and high productivity of the biaxial orientation blow-molded bottle.

Another technical object is to enlarge the passage of air into the preform thereby to achieve a high productivity of the biaxial orientation blow-molded bottle.

DISCLOSURE OF THE INVENTION

In the present invention for solving the aforementioned technical problems, an exemplary embodiment has the following configuration.

A preform holding jig for biaxial orientation blow-molding mounting a support portion holding an assembled posture of a preform having a bottomed cylindrical shape formed by a synthetic resin which is assembled by inserting a mouth cylinder portion, until an insertion limit, into the leading end portion of a cylindrical jig body in which a pin inserting bore is formed in the center for inserting a drawing pin therein.

Wherein said support portion is disposed in the inner circumference of the leading end portion of said jig body at a position opposed to a peripheral projecting ridge of said mouth cylinder portion, and for making external contact with the outer circumference of said peripheral projecting ridge as to be capable of inserting and extracting said mouth cylinder portion.

Accordingly, the support portion disposed in the inner circumference of the holding jig makes it possible to insert and extract the mouth cylinder portion so that the insertion and extraction can be performed, if necessary, in the manufacturing process of the bottle. Here, the insertion limit of the mouth cylinder portion can be set, for example, by the neck ring formed integrally with and circumferentially of the lower end of the outer circumference of the mouth cylinder portion, by the upper end portion of the mouth cylinder portion and the leading end face of the jig body, or the peripheral abutment against the circumferential step portion suitably added.

Moreover, the support portion is constructed to hold the assembled posture of the preform with the holding jig while making contact with the outer circumference of the peripheral projecting ridge of the preform. The preform can be held stably in a predetermined assembled posture by the support portion, even when the molding jig is not only attached to but also detached from the blow mold, and the rocking motion of the preform can also be inhibited to prevent the occurrence of production troubles, as might otherwise be caused by losing the posture during the transfer. Therefore, the rocking of the posture of the secondary intermediate being heated in the double blow molding can be eliminated to prevent the defective phenomenon such as the bite of the mold.

Here, the peripheral projecting ridge is formed in a circumferential ridge shape on the outer circumference of the mouth cylinder portion and at a position below the helical ridge and is named the bead ring or the step portion, too, so that it is utilized as the retaining portion of a pilfer-proof cap.

In the double blow molding method, the secondary intermediate molding shrunk from the primary intermediate one is mounted in a split mold and is blow molded. This secondary intermediate molding is not always fixed due to the thermal shrinkage but is slightly smaller in most cases than the final molding. With a small deflection of the held posture, the defective phenomena such as the contact with the split mold or the bite by the split mold is caused. Therefore, the aforementioned holding jig exhibits extremely effective actions and effects in the double blow molding method.

On the other hand, this support portion holds the posture of the preform from the outside of the preform thereby to inhibit the rocking motion of the preform. This method makes it unnecessary to provide the posture holding portion in the mouth cylinder portion of the preform.

Therefore, the inside of the preform can be effectively utilized in its entire inside for the flow passage of the blow air so that the blow air flow can be used to the maximum. This makes it possible to shorten the blowing time period and the cooling time period by the air circulation after the blow thereby to improve the production efficiency.

According to an exemplary embodiment, the preform holding jig for biaxial orientation blow-molding assembles and fixes an O-ring in an inner circumference groove formed in the inner circumference of the leading end portion of the jig body thereby to construct the support portion.

Accordingly, the mouth cylinder portion can be easily inserted and extracted while sliding with the O-ring. Moreover, the O-ring supports makes external contact with the entire outer circumference of the peripheral projecting ridge so that the assembled posture of the preform can be held properly and stably and so that the structure of the support portion is simplified.

According to an exemplary embodiment, the preform holding jig for biaxial orientation blow-molding assembles and fixes holder spring in an inner circumference groove formed in the inner circumference of the leading end portion of the jig body, thereby to construct the support portion.

Accordingly, the mouth cylinder portion can be easily inserted and extracted by utilizing the function of the holder spring, and the holder spring makes external contact with the outer circumference of the peripheral projecting ridge so that the posture of the preform can be held properly and stably by the elastic force of the holder spring, as set to a desired value.

According to an exemplary embodiment, the preform holding jig for biaxial orientation blow-molding is constructed by using the holder spring, which makes external contact with the outer circumference of the peripheral projecting ridge of the preform at a plurality of points positioned at substantially equally spaced central angles.

Accordingly, the mouth cylinder portion is supported at a plurality of points positioned at the substantially equally spaced central angles, without making external contact with the entire outer circumference of the peripheral projecting ridge. Therefore, the attachment and detachment of the preform can be achieved smoothly and reliably with a low resistance to the insertion and extraction.

According to an exemplary embodiment, the preform holding jig for biaxial orientation blow-molding is constructed by using the holder spring makes external contact with the outer circumference of the peripheral projecting ridge of the preform at three points positioned at substantially equally spaced central angles.

Accordingly, a two- or four-point support of the mouth cylinder portion is unstable, but the mouth cylinder portion is supported at the three points positioned at the substantially equally spaced central angles so that the deflection of the posture can be reliably suppressed. Because of this small number of supporting points, moreover, the resistance to the insertion and extraction can be so low that the attachment and detachment of the preform can be achieved smoothly and reliably.

According to an exemplary embodiment, the preform holding jig for biaxial orientation blow-molding is constructed such that the holder spring is made of a wire-shaped metal member and is generally C-shaped to include three straight portions positioned at the substantially equally spaced central angles, and two curved portions connecting the adjoining ones of the straight portions, so that the substantially central portions of the straight portions make external contact with the outer circumference of the peripheral projecting ridge.

Accordingly, the holder spring has the simple shape which is formed of the generally C-shaped metal wire member, so that the three-point support can be reliably achieved with the two curved portions and the two end portions abutting elastically against the bottom face of the inner circumference groove and with the three straight portions making external contact with the outer circumference of the peripheral projecting ridge at their substantially central portions.

Moreover, the holder spring is enabled by its simple shape to have easy attachment and detachment and an excellent durability and can be freed of such a problem that it is brought away from the inner circumference groove by the attachment and detachment of the preform, thereby to achieve a high productivity. By using the simple jig, it is possible to realize the attachment to and detachment from the inner circumference groove easily while simplifying the maintenance.

According to an exemplary embodiment, the preform holding jig for biaxial orientation blow-molding is constructed such that the metal member is formed to have such an elliptical section that its flattened portion makes external contact with the outer circumference of the peripheral projecting ridge.

Accordingly, the mouth cylinder portion of the preform is inserted with the helical ridge portion formed on the outer circumference being sliding on the generally central portions of the straight portions of the holder spring. The sliding face is exemplified by the flattened portion of the metal member having the elliptical section so that the inserting operation of the preform can be smoothly achieved with the wire-shaped metal member being not caught by the groove of the helical ridge.

According to an exemplary embodiment, the perform holding jig for biaxial orientation blow-molding, the support portion is constructed: by mounting smoothly surfaced ball members in circular transverse holes, in the state opening onto the inner circumference of the cylindrical wall at the leading end portion of said jig body formed to at least three portions at a space of substantially equally central angles with respect to the center axis of said jig body, such that the ball members may be unable to come out and such that they are partially protruded in a pushed state by elastic members; and by providing seal portions in said transverse holes for exhibiting sealing properties against blow air.

The aforementioned construction utilizes a function like a ball plunger, and the ball members move under pressure in the transverse holes so that the mouth cylinder portion of the preform can be smoothly inserted into and extracted from the holding jig by actions such as the rotations of the ball members. With the ball members making external contact with the peripheral projecting ridge, moreover, the assembled posture of the preform can be reliably held by the pressure of the elastic members. By adjusting the elastic forces of the elastic members, still moreover, it is possible to realize the proper insertion, extraction and posture holdability.

The ball members can be exemplified by those having little deformation due to an external force but an excellent surface slidability, such as stainless steel balls. The elastic members can be exemplified by an O-ring shaped member having elastic or rubbery properties or by a coil spring.

Here, the external contacting positions of the aforementioned O-ring, holder spring or balls with the peripheral projecting ridge can be determined according to the purpose or necessity. It is, however, preferable that the contacting positions are located by abutment against the lower end edge of the peripheral projecting ridge. Then, the lower end edge of the peripheral projecting ridge exhibits the function of the retaining member so that it can support the posture of the preform more reliably.

According to an exemplary embodiment, the preform holding jig for biaxial orientation blow-molding is constructed such that a neck ring formed integrally with and circumferentially of the lower end of the outer circumference of the mouth cylinder portion is made, with the jig body being attached to the blow mold, to make close abutment against an abutting step portion formed at the leading end open edge portion of the jig body.

Accordingly, the neck ring makes abutment at its upper face against the abutting step portion to determine the insertion limit of the mouth cylinder portion. Moreover, the neck ring of the preform is clamped, when the preform is mounted in the blow mold, between the blow mold and the abutting step portion of the jig body so that the preform with respect to the blow mold is fixed in a predetermined assembled posture.

Even when the preform is detached from the blow mold, moreover, its neck ring portion is abutting against the abutting step portion so that the blow molding is held in its posture at the two portions, i.e., at the peripheral projecting ridge and the neck ring. It is possible to inhibit the rocking motion of the blow molding especially in the transverse direction.

By the assembly of the holding jig with the blow mold, moreover, the neck ring of the preform is clamped between the neck supporting flanged portion of the blow mold and the abutting step portion of the jig body. As a result, the neck ring makes close abutment against the abutting step portion so that the sealing against the blow air is achieved.

Therefore, the neck ring is positioned at the lower end of the outer circumference of the mouth cylinder portion of the preform so that the mouth cylinder portion is positioned in its entirety in the blow pressure atmosphere no matter whether its portion might be outside or inside. The blow pressure can act homogeneously on the entire surface of the mouth cylinder portion to prevent the occurrence of the defective deformation such as the radially enlarged deformation of the mouth cylinder portion.

According to an exemplary embodiment, the preform holding jig for biaxial orientation blow-molding is constructed such that with the mouth cylinder portion of the preform being inserted to the insertion limit into the leading end portion of the jig body thereby to hold the posture of the preform, all the construction portions are spaced by at least one half of the internal diameter of the mouth cylinder portion from the center axis of the preform.

Here, the construction, in which with the posture of the preform being held, all the construction portions are spaced by at least one half of the internal diameter of the mouth cylinder portion from the center axis of the preform, is specified such that the column-shaped space having the internal diameter of the mouth cylinder portion but no portion to obstruct the flow of air is retained in the region from the pin inserting bore extending through the center of the jig body to the inside of the mouth cylinder portion of the preform.

Accordingly, the pin inserting bore of the jig body for the passage to feed the air to the inside of the mouth cylinder portion and the inside of the preform is cleared of the portion which obstructs the flow of air into the preform. The passage of air can be widened to the limit so that the flow rate of the blow air can be increased to shorten the blow time period, and the flow rate at the air circulation time can be increased to improve the cooling efficiency thereby to achieve an improvement in the productivity.

Usually, the air blow in the blow molding or the air circulation for cooling the bottle after blown is executed with the drawing pin being inserted in the holding jig and the preform. In the air blow, the blow air flows into the preform mainly from the clearance between the outer circumference of the drawing pin and the inner circumference of the mouth cylinder portion. At the air circulation time, the air flows through the passage formed in the drawing pin. According to the purpose, the effective sectional area to be used for the blow air or circulation air to flow can be determined mainly by the external diameter of the drawing pin.

According to an exemplary embodiment, the preform holding jig for biaxial orientation blow-molding is constructed such that with a guide cylinder member having a leading end portion radially reduced in a tapered shape and adapted to be inserted into the mouth cylinder portion of the preform is so erected into the pin inserting bore that its leading end portion is protruded from the leading end of the jig body.

Accordingly, the preform can be easily assembled with the holding jig by using the leading end portion of the guide cylinder member radially reduced in the tapered shape, as the guide. It is, therefore, possible to increase the degree of freedom of the precision design such as the holding jig transfer apparatus and to reduce the production troubles thereby to improve the productivity.

Here, the posture of the preform can be reliably held by the holding jig support portion of the present invention. Therefore, the guide cylinder member for holding the posture need not always be disposed inside of the preform so that the flow passage of the blow air can be accordingly widened substantially to the limit, as has been described hereinbefore. In the construction of the present invention, however, it is naturally one of branches for selection to employ that guide cylinder member in accordance with the mode of using the holding jig in the manufacture process and the necessity in the manufacture apparatus and the manufacture process.

According to an exemplary embodiment, the preform holding jig for biaxial orientation blow-molding is constructed such that a retained portion to be retained in an unextractable manner in a transfer apparatus is provided in the outer circumference of the root end portion of the jig body.

Accordingly, even with a resistance by the support portion when the blow molding such as the blow molded bottle is extracted from the holding jig, the assembly of the jig body with the transfer apparatus is retained by that retained portion. Therefore, the jig body is neither raised together with the blow molding nor leaves the transfer apparatus to prevent the troubles in the production line.

According to an exemplary embodiment, the preform holding jig for biaxial orientation blow-molding, comprising a cylindrical jig body having a pin inserting bore formed therethrough at its center for a drawing pin to be inserted thereinto, and formed into a cylindrical shape having such an internal diameter that its leading end portion may make loose, external contact with the mouth cylinder portion of such a preform formed of a synthetic resin into a bottomed cylindrical shape, and with the mouth cylinder portion of the preform being inserted to the insertion limit into the leading end portion of the jig body thereby to hold the preform, all the construction portions are spaced by at least one half of the internal diameter of the mouth cylinder portion from the center axis of the preform.

Here, the construction, in which with the posture of the preform being held, all the construction portions are spaced by at least one half of the internal diameter of the mouth cylinder portion from the center axis of the preform, is specified such that the column-shaped space having the internal diameter of the mouth cylinder portion but no portion to obstruct the flow of air is retained in the region from the pin inserting bore extending through the center of the jig body to the inside of the mouth cylinder portion of the preform.

Accordingly, the pin inserting bore of the jig body for the passage to feed the air to the inside of the mouth cylinder portion and the inside of the preform is cleared of the portion which obstructs the flow of air into the preform. The passage of air can be widened to the limit so that the flow rate of the blow air can be increased to shorten the blow time period, and the flow rate at the air circulation time can be increased to improve the cooling efficiency thereby to achieve an improvement in the productivity.

Usually, the air blow in the blow molding or the air circulation for cooling the bottle after blown is executed with the drawing pin being inserted in the holding jig and the preform. In the air blow, the blow air flows into the preform mainly from the clearance between the outer circumference of the drawing pin and the inner circumference of the mouth cylinder portion. At the air circulation time, the air flows through the passage formed in the drawing pin. According to the purpose, the effective sectional area to be used for the blow air or circulation air to flow can be determined mainly by the external diameter of the drawing pin.

Moreover, the inner circumference of the leading end portion of the holding jig makes loose, external contact with the mouth cylinder portion of the preform. When at least the preform is erected upside-down and inserted in the jig body, its posture can be held, and its mouth cylinder portion can be easily inserted into and extracted from the leading end portion of the jig body. According to the purpose, however, the strength of the external contact relating to the holdability of the posture and the insertion and extraction can be adjusted by setting the internal diameter of the leading end portion of the jig body.

Here, the insertion limit of the mouth cylinder portion can be set, for example, by the neck ring formed integrally with and circumferentially of the lower end of the outer circumference of the mouth cylinder portion, by the upper end portion of the mouth cylinder portion and the leading end face of the jig body, or the peripheral abutment against the circumferential step portion suitably added.

According to an exemplary embodiment, the preform holding jig for biaxial orientation blow-molding is constructed such that a neck ring formed integrally with and circumferentially of the lower end of the outer circumference of the mouth cylinder portion is made, with the jig body being attached to the blow mold, to make close abutment against an abutting step portion formed at the leading end open edge portion of the jig body.

Accordingly, the upper face of the neck ring makes abutment against the abutting step portion to determine the insertion limit of the mouth cylinder portion. While the preform is mounted in the blow mold, moreover, its neck ring is clamped between the blow mold and the abutting step portion of the jig body so that the preform is fixed at a predetermined assembled posture with respect to the blow mold.

When the preform is detached from the blow mold, on the other hand, the neck ring portion makes abutment against the abutting step portion, and the blow molding is held in its posture at the two portions of the peripheral projecting ridge and the neck ring so that it is reliably inhibited in the rocking motion in the transverse direction.

By the assembly of the holding jig with the blow mold, moreover, the neck ring of the preform is clamped between the neck supporting flanged portion of the blow mold and the abutting step portion of the jig body so that it makes close abutment against the abutting step portion thereby to achieve the sealing against the blow air.

Therefore, the neck ring is positioned at the lower end of the outer circumference of the mouth cylinder portion of the preform so that the mouth cylinder portion is positioned in its entirety in the blow pressure atmosphere no matter whether its portion might be outside or inside. The blow pressure can act homogeneously on the entire surface of the mouth cylinder portion to prevent the occurrence of the defective deformation such as the radially enlarged deformation of the mouth cylinder portion.

According to an exemplary embodiment, the preform holding jig for biaxial orientation blow-molding is constructed such that a retained portion to be retained in an unextractable manner in a transfer apparatus is provided in the outer circumference of the root end portion of the jig body.

Accordingly, even with a resistance by the support portion when the blow molding such as the blow molded bottle is extracted from the holding jig, the assembly of the jig body with the transfer apparatus is retained by that retained portion. Therefore, the jig body is neither raised together with the blow molding nor leaves the transfer apparatus to prevent the troubles in the production.

BEST MODE FOR CARRYING OUT THE INVENTION

Embodiments of the present invention will be described in the following with reference to the drawings.

Figure 1:
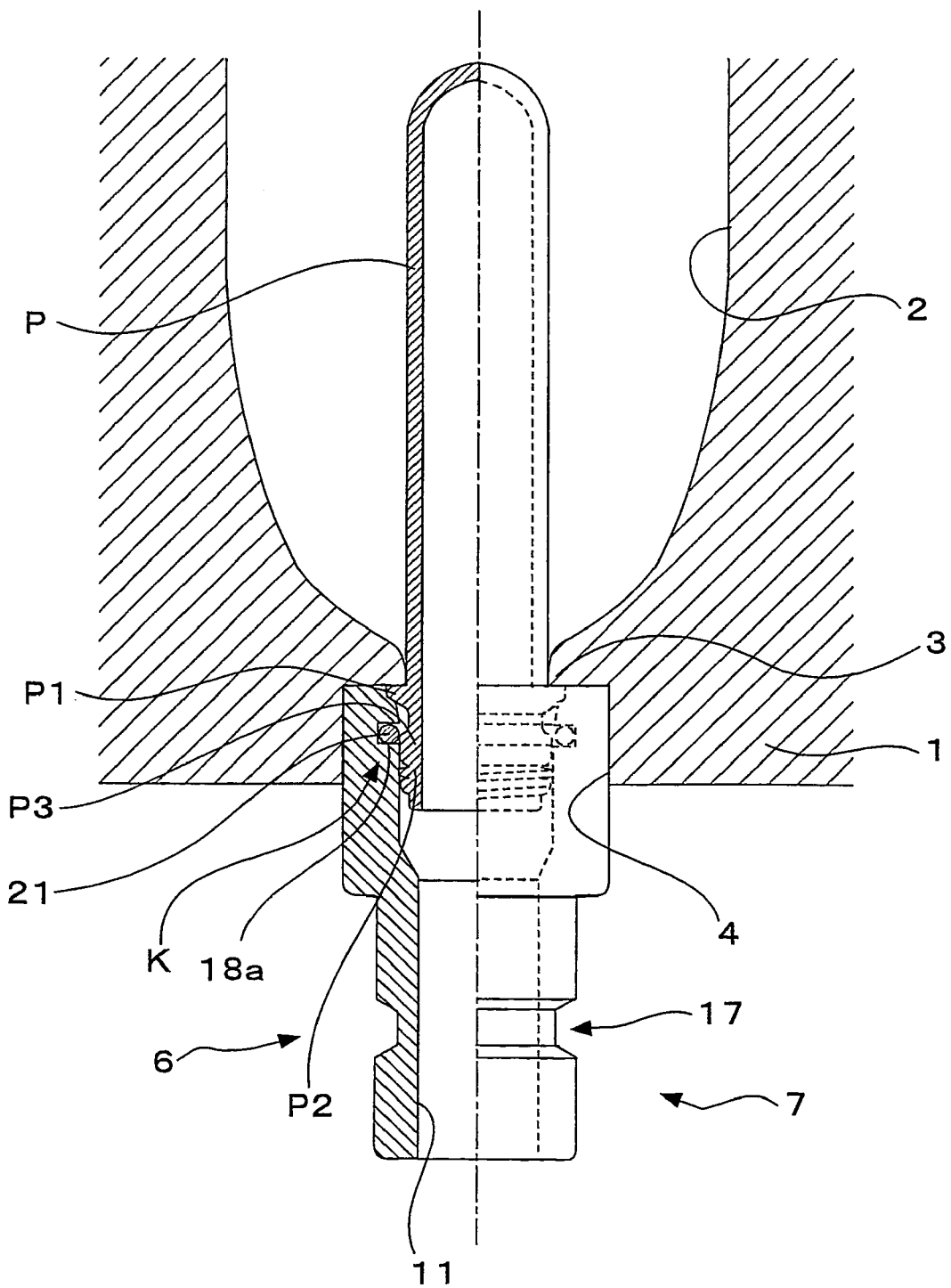
FIG. 1 is a front elevation showing the state, in which a first embodiment of present invention is mounted in a blow mold, with one lefthand half being presented in a longitudinal section.
Figure 2:
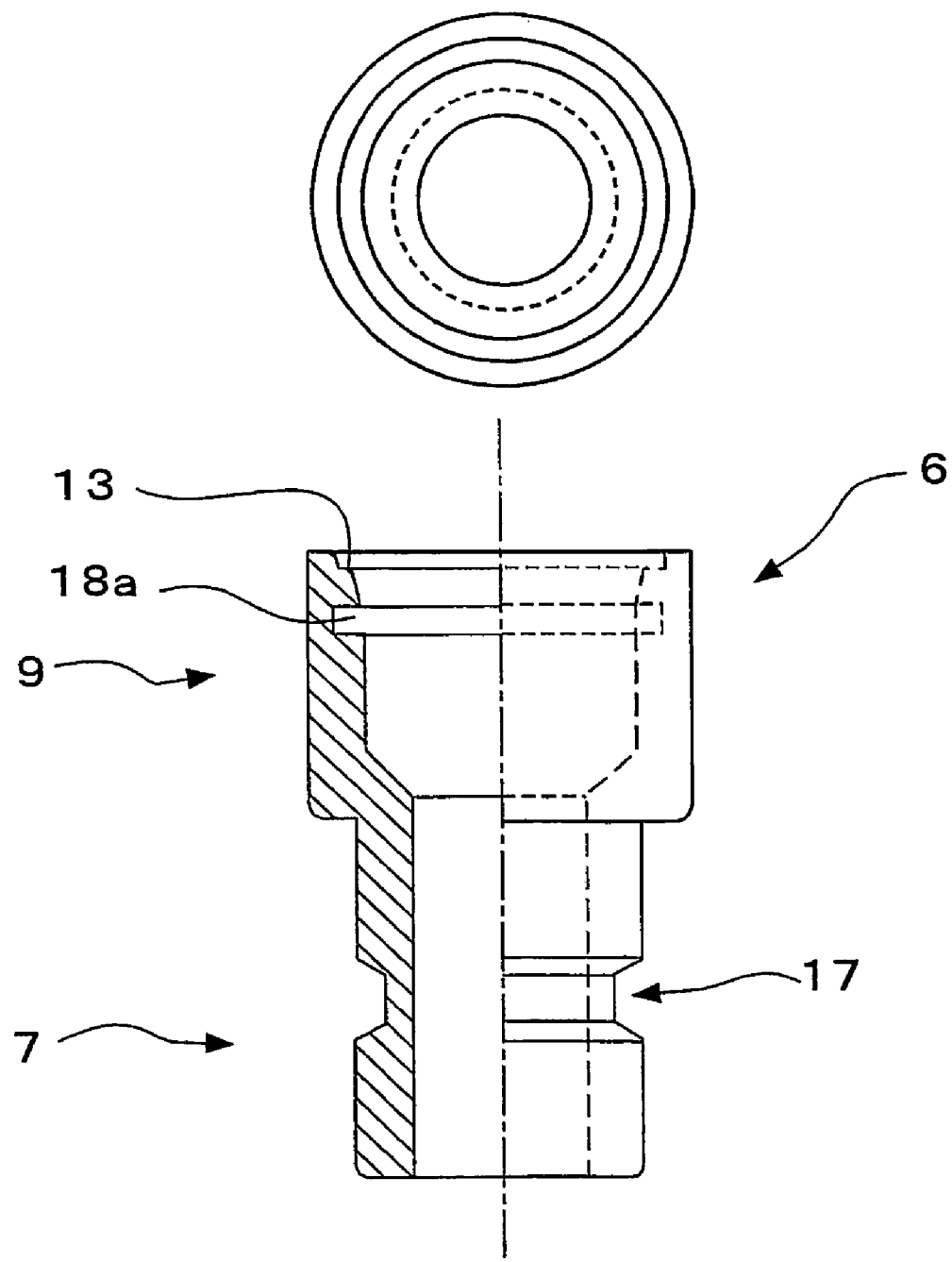
FIG. 2 presents a front elevation and a top plan view showing the first embodiment of the present invention.
Figure 3:
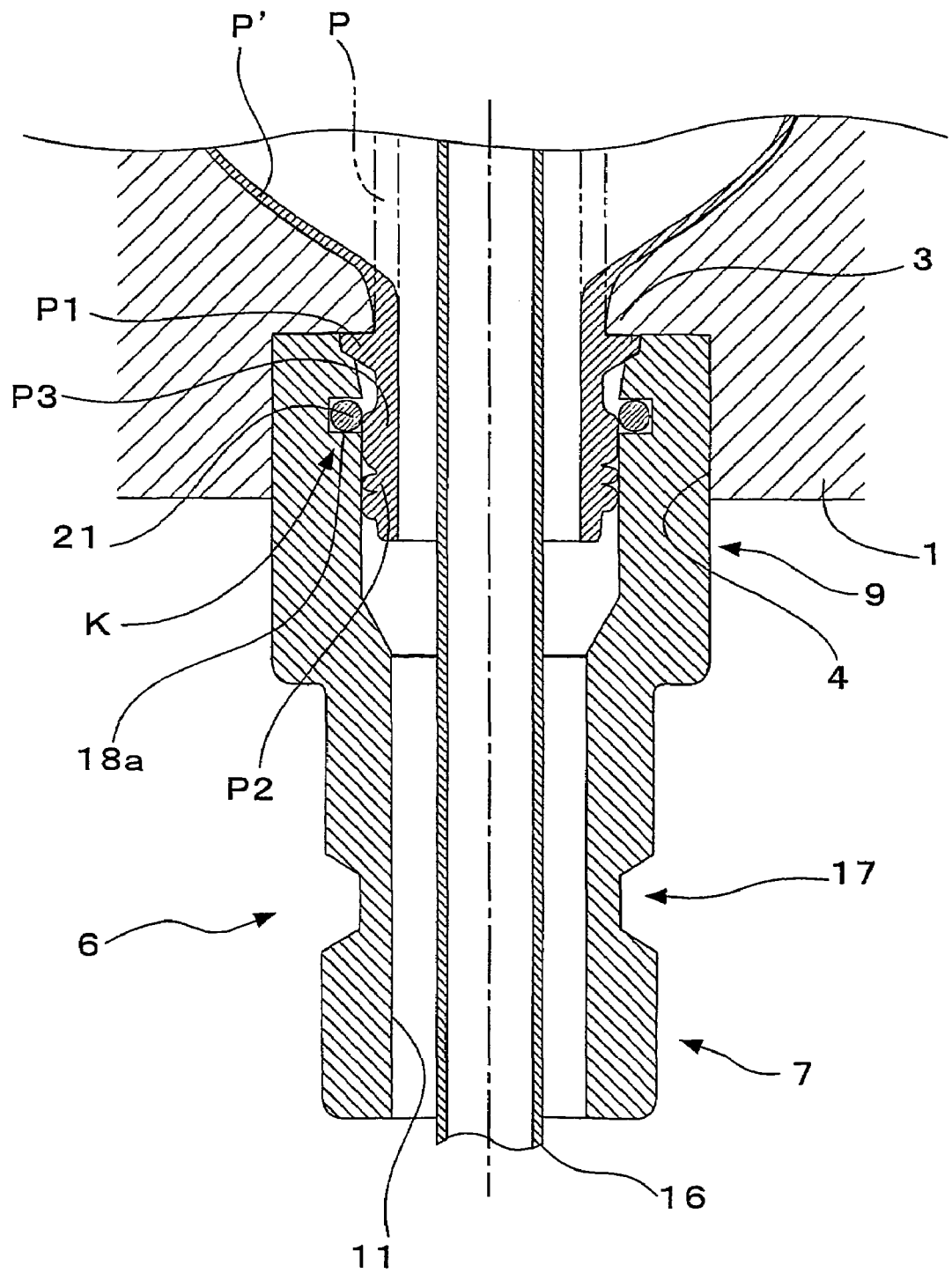
FIG. 3 is an essential portion enlarged longitudinal section showing the state, in which the first embodiment of the present invention is mounted in the blow mold and in which a drawing pin is inserted into the embodiment.

FIG. 1 shows the state, in which a preform P is attached to a holding jig of a first embodiment according to the present invention and in which the holding jig is mounted in a blow mold 1. FIG. 3 shows the state, in which a drawing pin 16 is further inserted. FIG. 2 presents a front elevation having half longitudinal section and a top plan view showing a jig body 6. The jig body 6 is constructed by merging a fitted cylinder portion 9, which has an external diameter enlarged to be fitted in and assembled with an assembly recess 4 of the blow mold 1, with the upper end of a shank cylinder portion 7, which has such a retained portion 17 of a circumference groove shape formed in the outer circumference as is to be assembled with the not-shown transfer apparatus and which has a relatively smaller external diameter.

The shank cylinder portion 7 has an internal diameter slightly larger than that of a mouth cylinder portion P2 of the preform P. The fitted cylinder portion 9 has such an internal diameter at its lower portion as is equal to that of the shank cylinder portion 7 and such an internal diameter over a radially enlarged portion that it can make gentle, external contact with a peripheral projecting ridge P3 to receive the mouth cylinder portion P2 easily and that it is radially enlarged upward in a gently counter-tapered shape. An inner circumference groove 18a for assembling and holding an O-ring 21 is formed in the inner circumference of the fitted cylinder portion 9 above the height position, which confronts the peripheral projecting ridge P3 of the mouth cylinder portion P2 when the mouth cylinder portion P2 of the preform P is fitted in the fitted cylinder portion 9 from the opening of the upper portion (or the leading end portion) to bring the upper face of a neck ring P1 into abutment against a later-described abutting step portion 13.

At the upper end portion of the fitted cylinder portion 9, moreover, there is formed the abutting step portion 13, which makes abutment, while closely contacting, against the upper face of the neck ring P1 thereby to determine the fitting limit of the mouth cylinder portion P2 and to exhibit a sealing effect for the blow air. At the blow molding time, the mouth cylinder portion P2 is positioned in its entirety in the blow pressure atmosphere and is subjected to the uniform blow pressure all over its surface so that it can be prevented from being irregularly deformed or radially enlarged.

Figure 4:
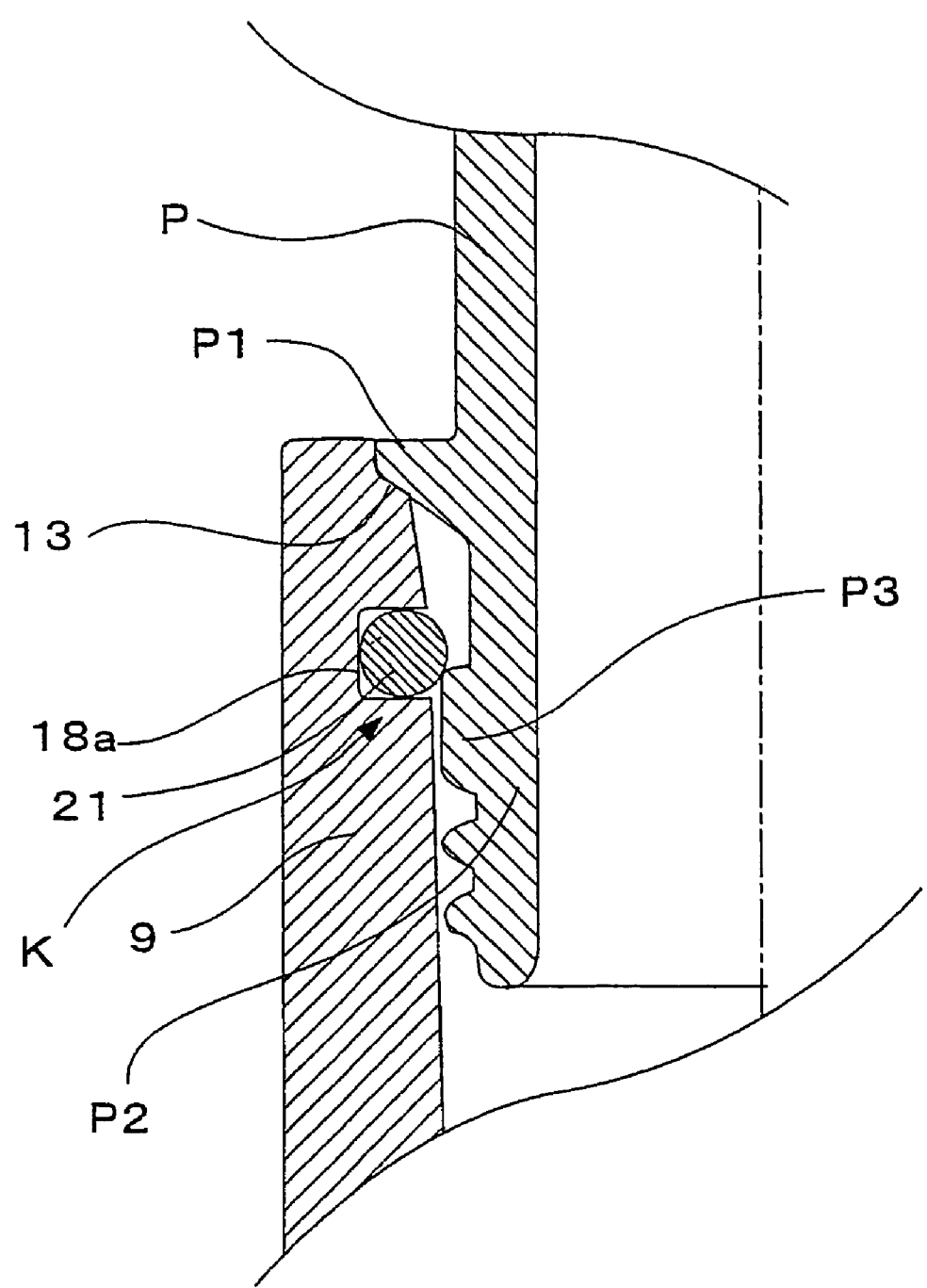
FIG. 4 is an essential portion enlarged longitudinal section of the state, in which a preform is mounted in the first embodiment of the present invention.

In the present first embodiment, a support portion K is constructed by assembling and fixing the O-ring 21 with the inner circumference groove 18a. This O-ring 21 makes external contact with the lower end edge of the peripheral projecting ridge P3 formed circumferentially of the mouth cylinder portion P2 of the preform P thereby to hold the posture of the preform P (as referred to FIG. 1 and FIG. 4).

Moreover, the neck ring P1 has its upper face abutting against the abutting step portion 13 of the fitted cylinder portion 9 (as referred to FIG. 4), and this abutting portion of the neck ring P1 is in the state to exhibit the active function to hold the posture of the preform P. As a result, the preform P has its posture supported at the two portions, i.e., the peripheral projecting ridge P3 and the neck ring P1 so that it can be held more reliably in its posture and inhibited in its rocking motion.

Here, the holding of the assembled position of the preform P with the holding jig should not be limited to the support by that support portion K and the abutting step portion 13 for the neck ring P1. In case the threaded portion of the mouth cylinder portion P2 and the mouth cylinder portion P2 are thermally crystallized (or blushed), for example, the abutment against the leading end face of the mouth cylinder portion P2 can also act to hold the posture.

With the jig body 6 is attached to the blow mold 1, moreover, the preform P is held in its posture by the action of the support portion K, and the neck ring P1 is reliably clamped between the abutting step portion 13 and a neck supporting flanged portion 3 of the blow mold 1. During the blow-drawing molding operation, therefore, the preform P can also be reliably inhibited.

Figure 14:
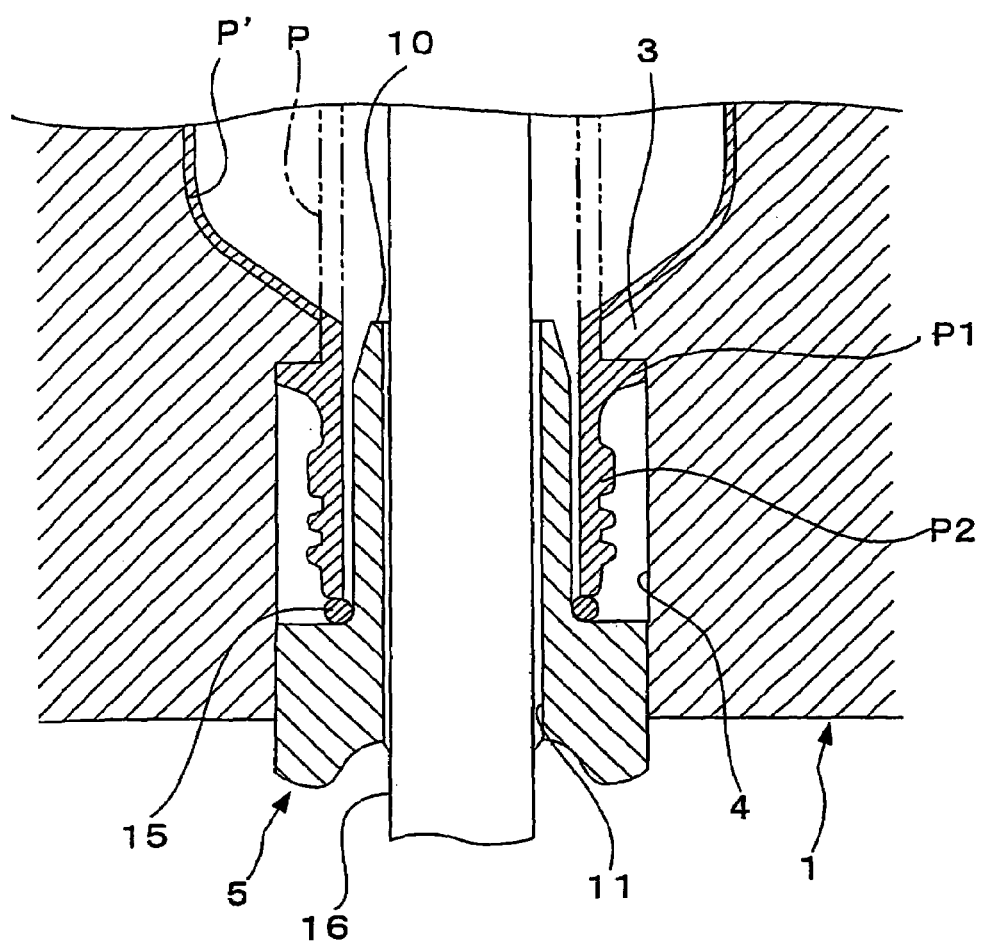
FIG. 14 is an essential portion enlarged longitudinal section showing an example of the prior art.

FIG. 3 shows the state, in which the drawing pin 16 is inserted in a pin inserting bore 11 of the jig body 6. The posture of the preform P can be reliably held by the support portion K making external contact with the mouth cylinder portion P2. Unlike the example of the prior art (as referred to FIG. 14), therefore, it is unnecessary to provide a guide cylinder member 10 on the inner side of the preform P for holding the posture. Moreover, the shank cylinder portion 7 of the jig body 6 has an internal diameter slightly larger than that of the mouth cylinder portion P2 so that no portion to obstruct the flow of air exists.

Here in the present first embodiment, as in a second, third, fourth or sixth embodiment to be described hereinafter, all the components are spaced, while holding the preform P, at a distance of at least one half of the internal diameter of the mouth cylinder portion P2 from the center axis of the preform P. This construction eliminates the portion, as might otherwise obstruct the flow of air into the preform P, from the inside of the mouth cylinder portion P2 and from the pin inserting bore 11 of the jig body 6, which provides the passage for feeding the air into the preform P. Therefore, the passage of air can be widened to the limit and retained.

Here, if the external diameter of the drawing pin 16 is set to a small value, the clearance to be formed between the outer circumference of the drawing pin 16 and the inner circumference of the mouth cylinder portion P2 can be enlarged to increase the flow rate of the blow air accordingly. By enlarging the diameter of the drawing pin 16, on the contrary, it is enabled to increase the flow rate of air to be circulated in the drawing pin 16. Thus, the diameter of the drawing pin 16 can be selected in conformity with a purpose.

In case the support portion K of the present embodiment is adopted, on the other hand, a more or less sliding resistance arises when the preform P is extracted upward from the holding jig. However, this extraction can be easily achieved by fixing the jig body 6 on the transfer apparatus using the retained portion 17 of the circumference groove shape formed in the shank cylinder portion 7 of the jig body 6.

Here in the aforementioned first embodiment, as in the remaining embodiments to be described hereinafter, there is described the case, in which the preform P is inserted upside-down into the upright jig body 6 and in which this upright posture is held. According to the support portion K of the present embodiment, however, the posture to be taken by the preform P should not be limited to the described one but could be held in any direction according to the purpose or necessity, such as a posture in which the preform P is inserted upward or a posture in which the preform P is inserted horizontally. This variable posture has such an effect in the continuous production process, for example, as to widen the degree of freedom for designing or arranging the individual units of the transfer apparatus or the like.

In a second embodiment of the holding jig of the present invention, the support portion K is constructed by mounting a holder spring 22 in the inner circumference groove 18a in place of the O-ring 21 of the first embodiment. The holder spring 22 exhibits an inward fastening force with the force of the spring so that it can hold the posture of the preform P more reliably, while making external contact with the peripheral projecting ridge P3 of the preform P, can be inhibited in its rocking motion.

Figure 5:
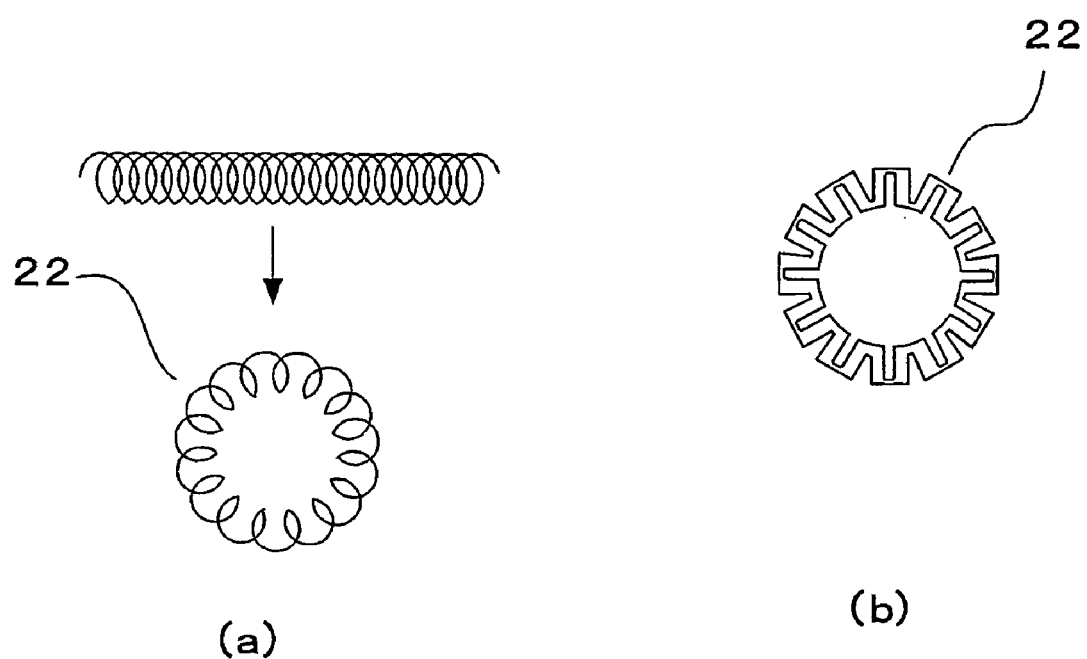
FIG. 5 is a top plan view showing an example of a holder spring to be used in a second embodiment of the present invention.

FIG. 5(a) shows one example of the holder spring 22, which is rounded in a coiled spring into an O-ring shape. This holder spring 22 is fitted in the inner circumference groove 18a with its inner circumference of the O-ring shape being partially protruded from the inner circumference of the fitted cylinder portion 9, and is brought for use into abutment against the lower end portion of the peripheral projecting ridge P3. FIG. 5(b) shows another example of the holder spring.

The holder spring 22 can select the optimum shape, elastic force and so on according to the purpose while balancing the inserting and extracting properties of the mouth cylinder portion P2 and the posture holdability, durability and so on of the preform P.

Figure 6:
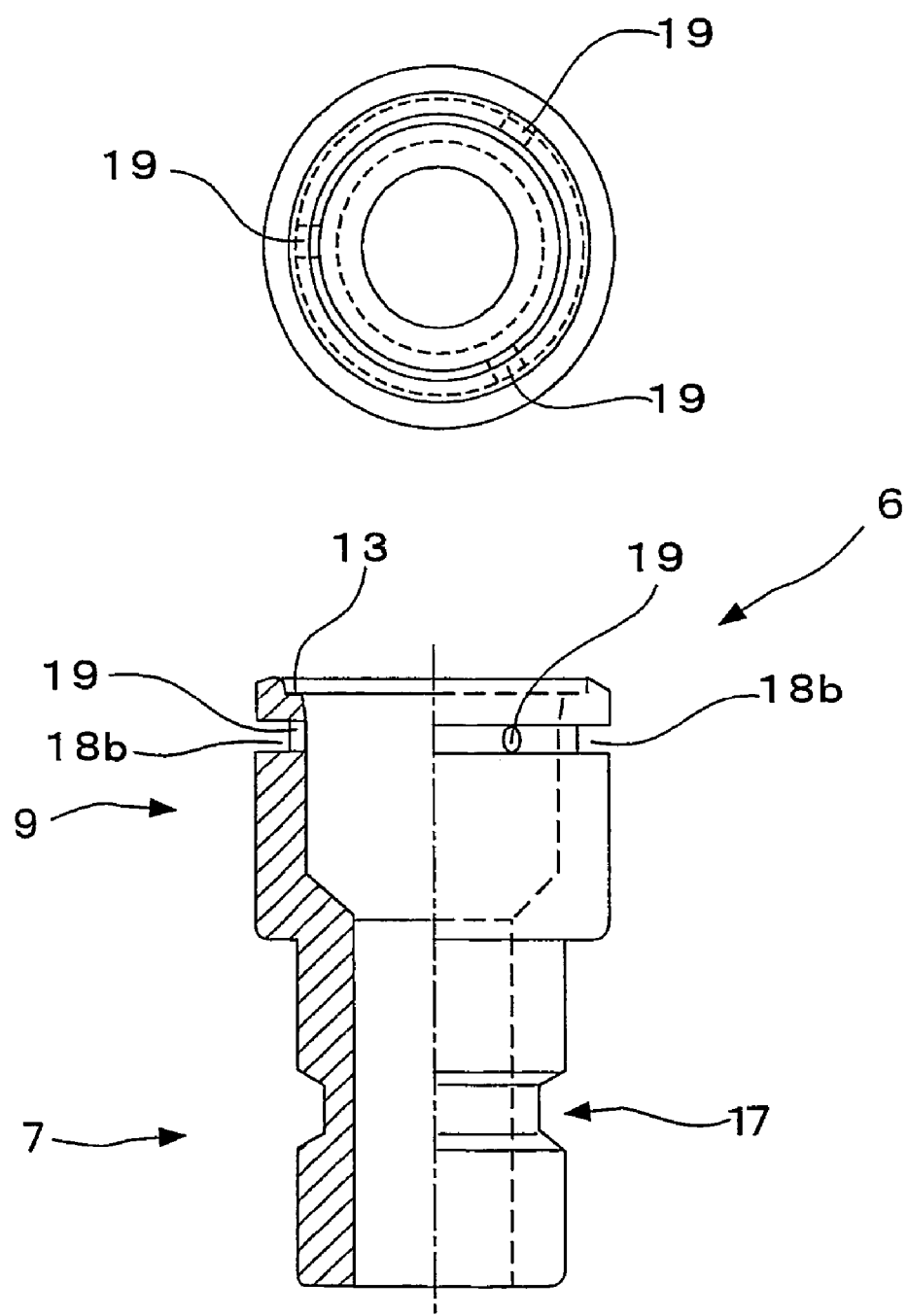
FIG. 6 presents a front elevation and a top plan view showing a third embodiment of the present invention.

FIG. 6 presents a front elevation and a top plan view showing the jig body 6 of a third embodiment of the present invention. In the outer circumference of the upper portion of the fitted cylinder portion 9, there is formed an outer circumference groove 18b for assembling and holding an outer circumference seal ring 26 having properties of rubber elasticity so that ball members 23 may make abutment against the lower end edge of the peripheral projecting ridge P3 of the mouth cylinder portion P2. From the bottom portion of the outer circumference groove 18b, moreover, there are formed three circular transverse holes 19, which are so positioned at central angles equally spaced from each other with respect to the center axis of the fitted cylinder portion 9 as to extend through the wall of the fitted cylinder portion 9.

Figure 7:
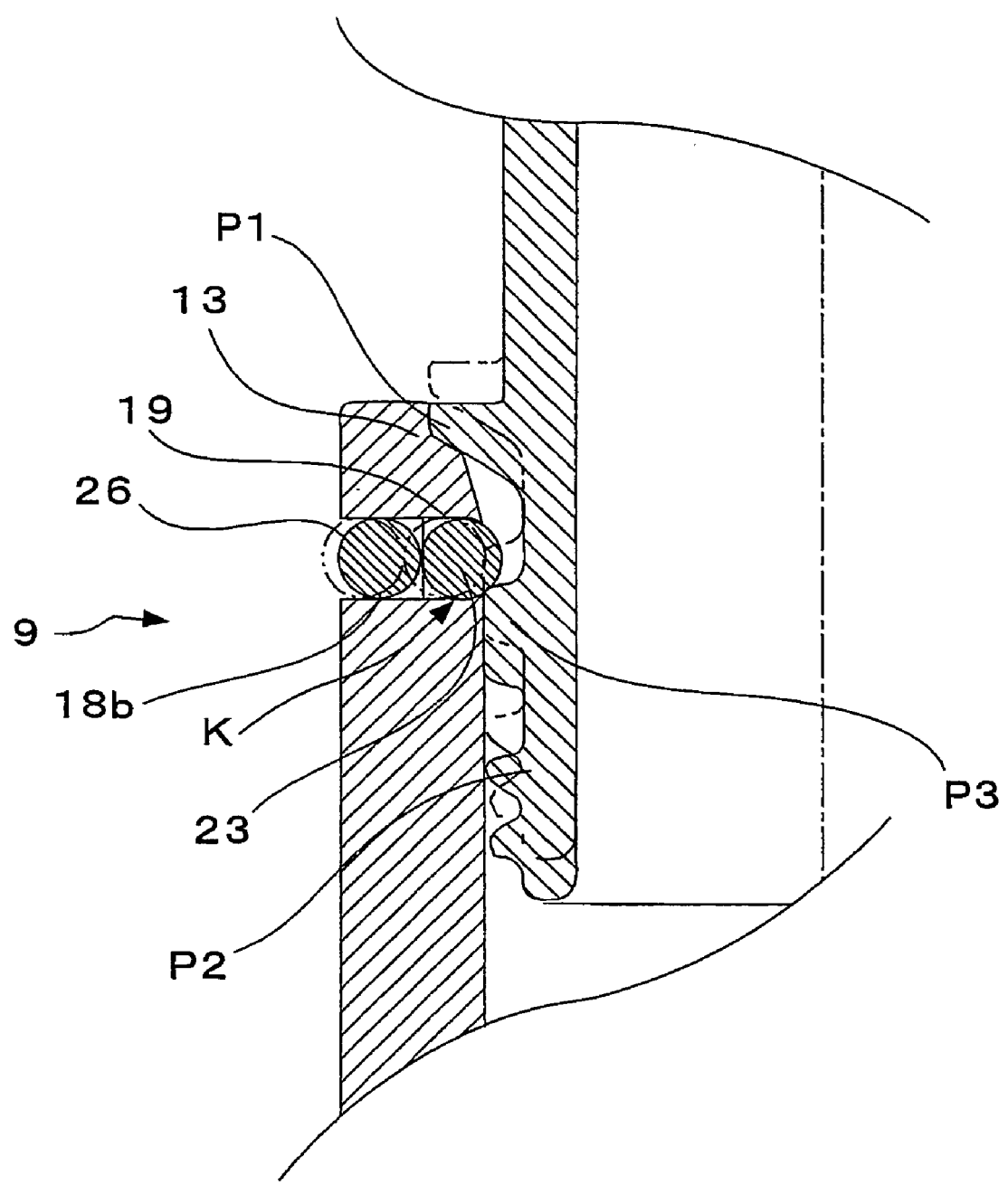
FIG. 7 is an essential portion enlarged longitudinal section of the state, in which a preform is mounted in the third embodiment of the present invention.

In the present embodiment, the ball members 23 are made of stainless steel balls, and the transverse holes 19 are so shaped that their inner end portions are slightly radially reduced. When the ball members 23 are fitted in those transverse holes 19 and when the outer circumference sealing ring 26 is so set in the outer circumference groove 18b as to hold the ball members 23 from the outside, the ball members 23 are partially protruded to the inner circumference of the fitted cylinder portion 9 (as referred to FIG. 7) while being pushed by the outer circumference seal ring 26.

Moreover, this outer circumference seal ring 26 constructs a seal portion for exhibiting the sealing properties against the blow pressure, thereby to perform a function to seal the blow air.

With the mouth cylinder portion P2 being inserted to its insertion limit into the fitted cylinder portion 9, the ball members 23 are partially retained by the lower end edge of the peripheral projecting ridge P3, thereby to make it possible to exhibit the functions to hold the posture of the preform P and to inhibit the rocking motion, more reliably. The attachment and detachment of the preform P can be executed without any high resistance by the actions such as the rotations of the ball members 23 (as referred to FIG. 7).

Figure 8:
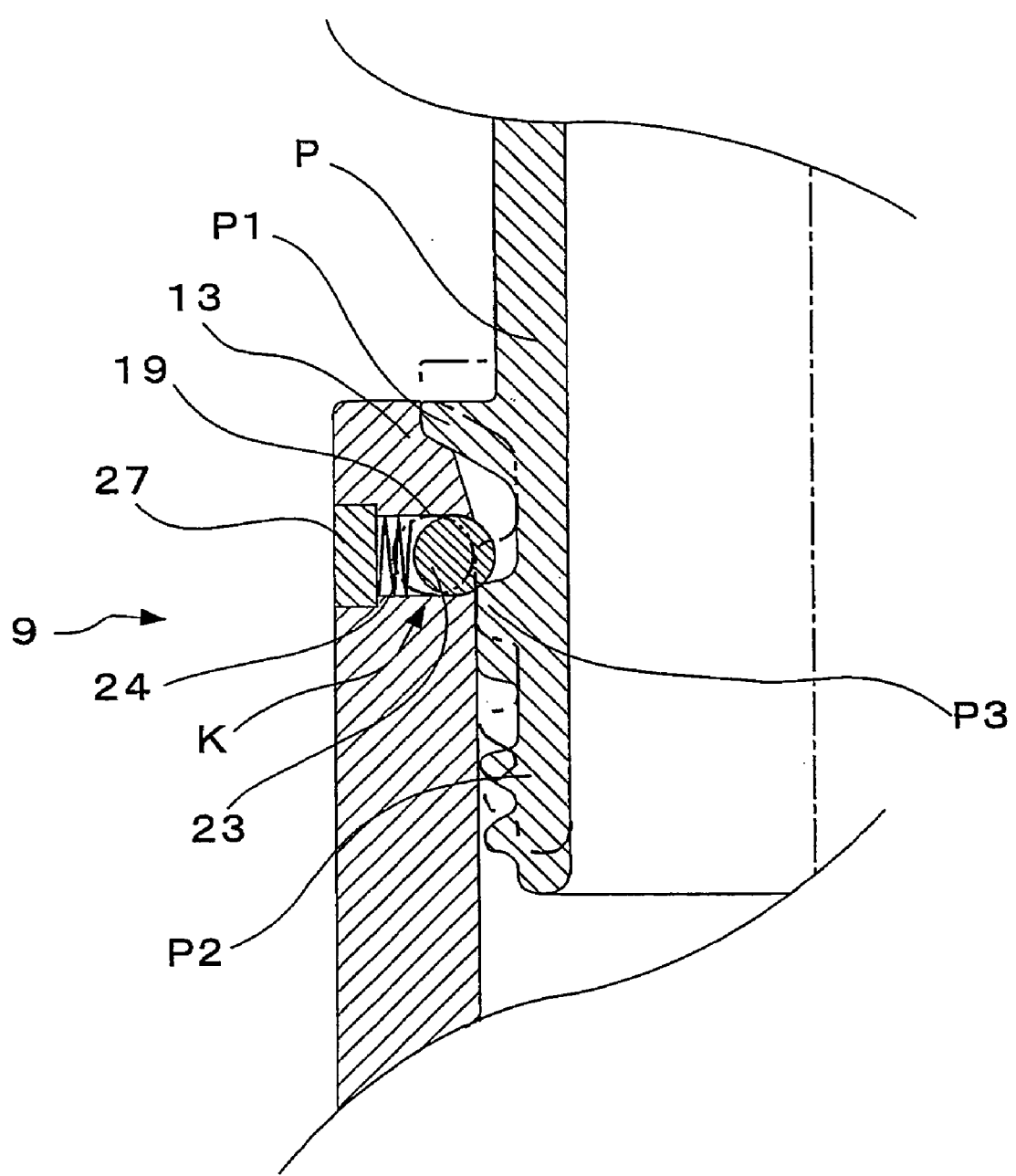
FIG. 8 is an essential portion enlarged longitudinal section of the state, in which a preform is mounted in a fourth embodiment of the present invention.

FIG. 8 is an explanatory view of another or a fourth embodiment of the present invention utilizing the actions of the ball members 23. A spring 24 performs the function to apply the pressure to the ball member 23, and a plug 27 constructs the seal portion to exhibit the sealing properties against the blow air thereby to perform the function to seal the blow air.

Here, the actions by the ball members 23 as in the third embodiment and the fourth embodiment can also be achieved by helically assembling a commercially available ball plunger having a helical ridge in its outer circumference, with the transverse hole 19 having a helical ridge, in such a state as can hold the seal.

Figure 9:
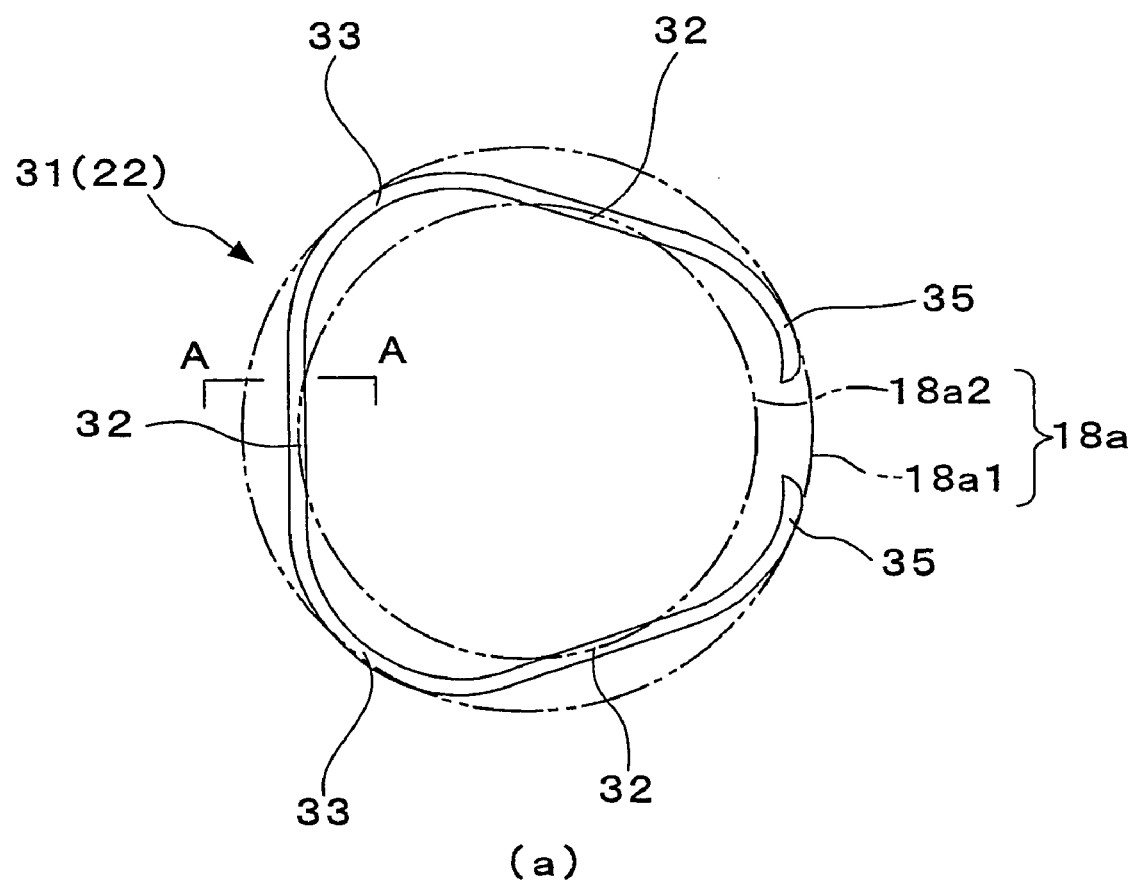
FIG. 9 presents a top plan view (a) and a sectional view (b) showing a C-shaped spring to be used in a fifth embodiment of the present invention.
Figure 9:
Figure 10:
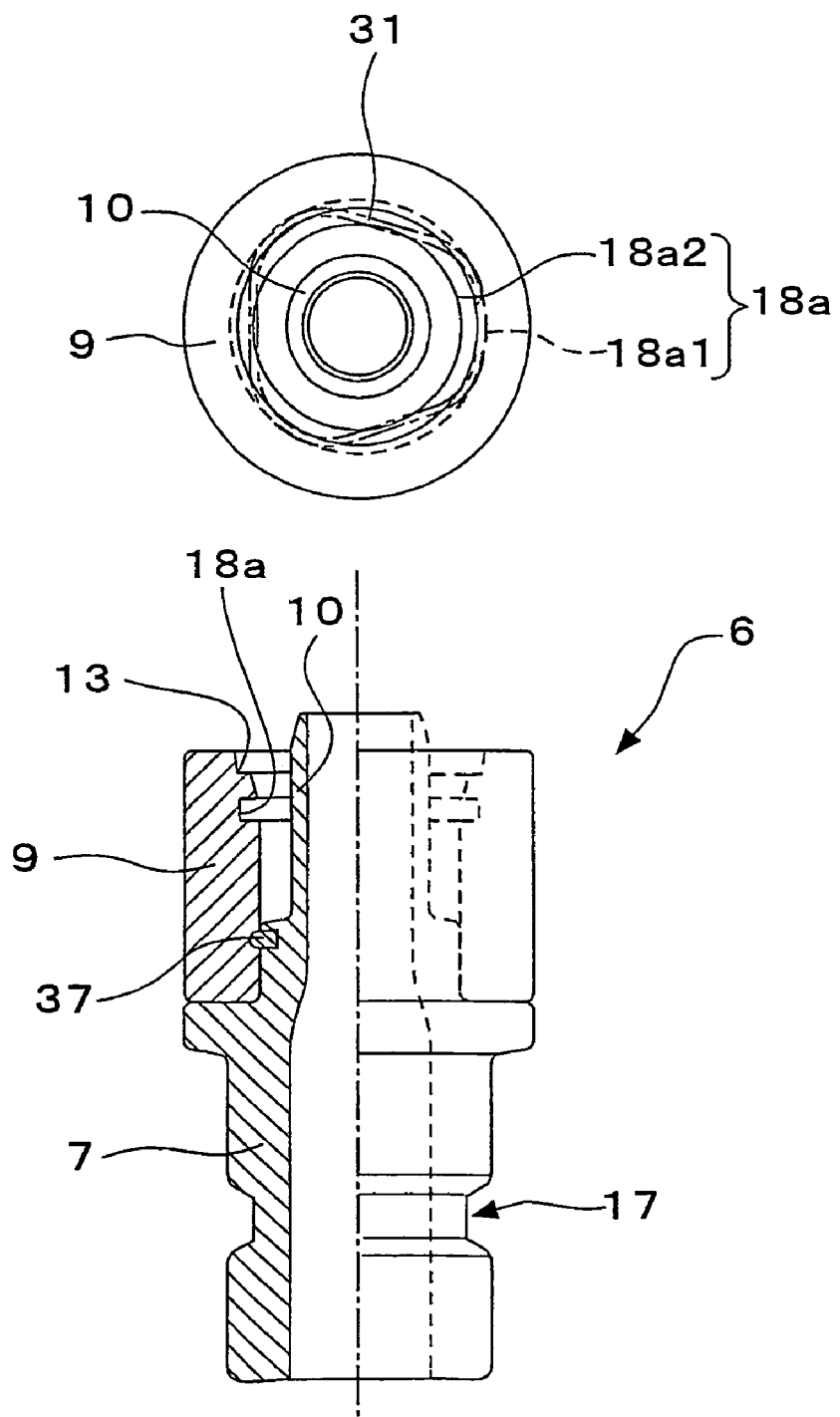
FIG. 10 presents a front elevation and a top plan view showing the fifth embodiment of the present invention.
Figure 11:
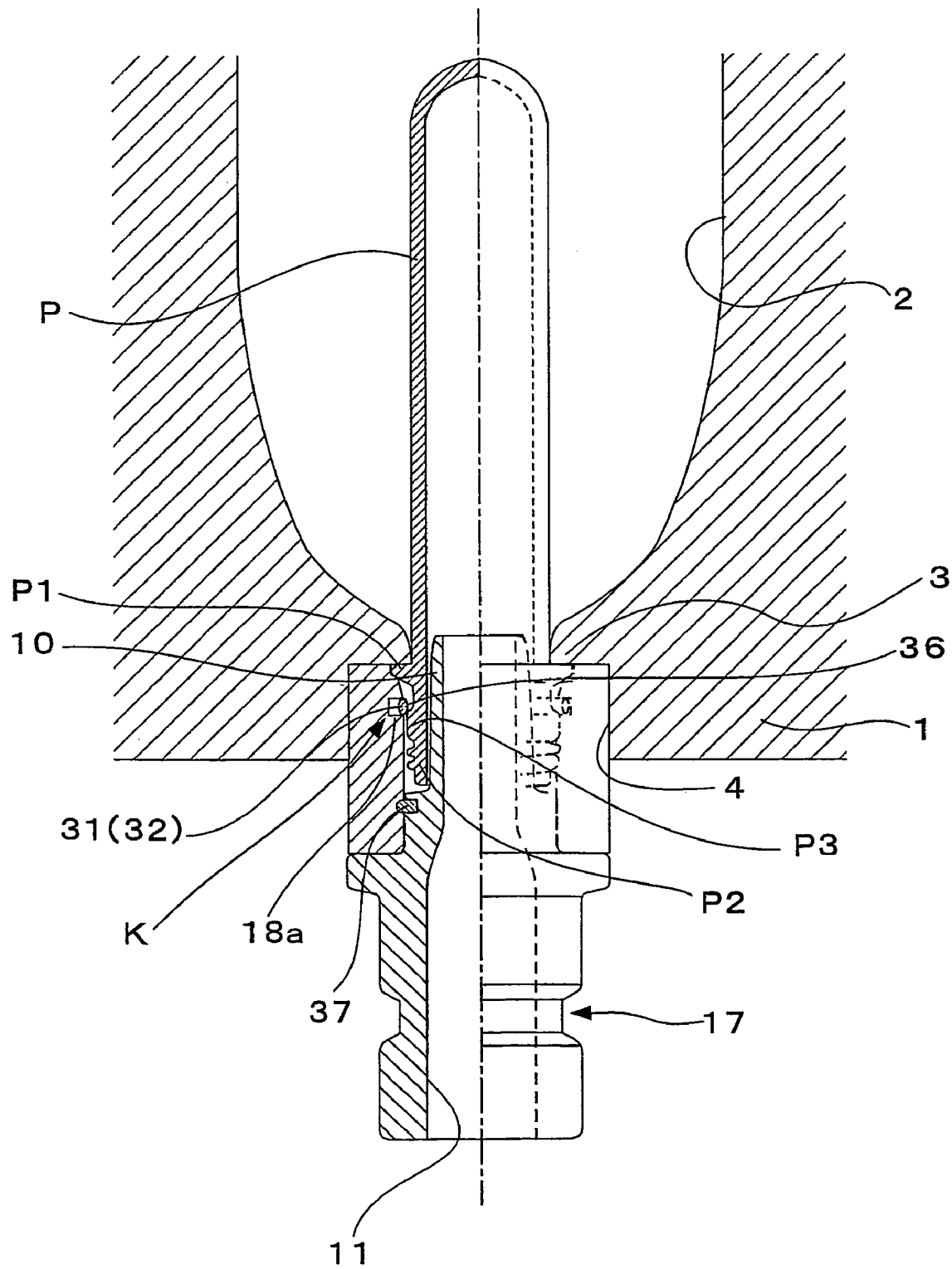
FIG. 11 is a front elevation showing the state, in which a fifth embodiment of present invention is mounted in a blow mold, with one lefthand half being presented in a longitudinal section.

FIG. 9 to FIG. 12 show a fifth embodiment of the present invention, in which a C-shaped spring 31 (as referred to FIG. 9) is used as the holder spring 22 and in which the guide cylinder member 10 is erected in the pin inserting bore 11 (as referred to FIG. 10).

In the present fifth embodiment, the shank cylinder portion 7 and the fitted cylinder portion 9 are made so separate that the guide cylinder member 10 may be added to the jig body 6, and the sealing properties of the two are retained by a seal portion 37. However, the remaining portions have a structure substantially similar to that of the first embodiment. Moreover, the guide cylinder member 10 is erected from the upper end portion of the shank cylinder portion 7. However, this guide cylinder member 10 is radially reduced in a gently tapered shape toward the leading end portion so that it can be easily inserted into the mouth cylinder portion P2 of the preform P.

When the C-shaped spring 31 is set in the inner circumference groove 18a, two curved portions 33 and individually curved two end portions 35 come into elastic abutment against the bottom face 18a1 of the inner circumference groove 18a (as referred to FIG. 9 (a) and FIG. 10). The C-shaped spring 31 is not disengaged by the vibration of the holding jig being moved, for example, so that its posture is stably held.

Figure 12:
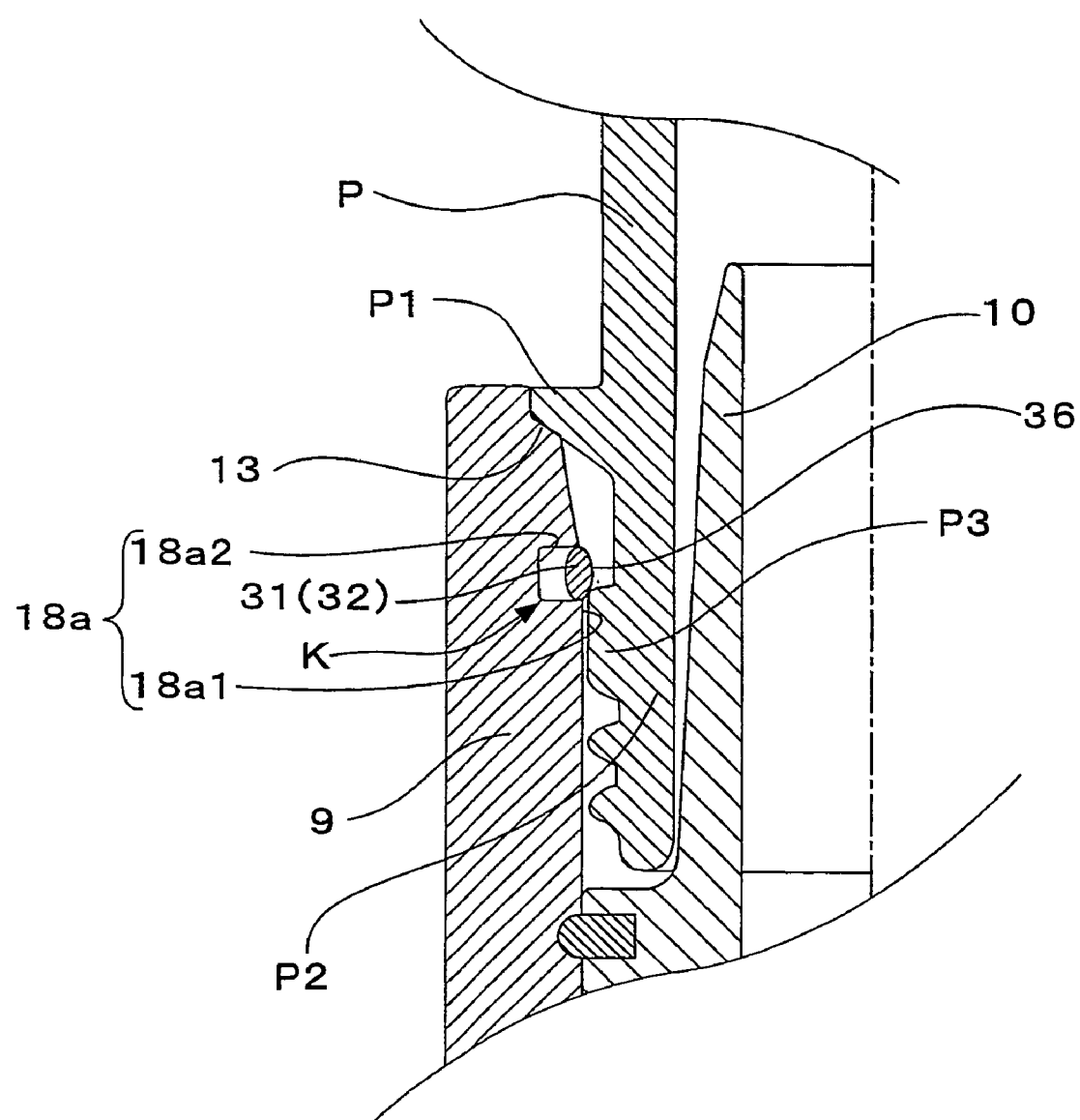
FIG. 12 is an essential portion enlarged longitudinal section of the state, in which a preform is mounted in the fifth embodiment of the present invention.

Moreover, three straight portions 32 slightly protrude at their generally central portions from an inner circumference 18a2 of the fitted cylinder portion 9 (as referred to FIG. 9, FIG. 12 and so on). These three points can hold the posture of the preform P to inhibit the rocking motion more reliably while making external contact with the outer circumference, especially the lower end edge of the peripheral projecting ridge P3. Here, this three-point supporting method can inhibit the rocking motion more reliably not only than the two-point support but also the four-point support. As compared with the more-point supporting method, moreover, the three-point supporting method is featured in that it can achieve the attachment and detachment of the preform P can be easily achieved.

Moreover, this C-shaped spring 31 has a remarkably simple structure and an excellent durability and can be easily replaced by using a simple jig. The C-shaped spring 31 does not come out due to the aforementioned vibration or the like of the holding jig being moved but can reduce the trouble in the production so that it can achieve a high productivity.

In the present fifth embodiment, moreover, the metal member forming the C-shaped spring 31 is formed into an elliptical sectional shape (in which the ratio of the longer diameter to the shorter diameter is set at 2:1 (as referred to FIG. 9(b)). The flattened portion 36 of this metal member makes external contact with the lower end edge of the outer circumference of the peripheral projecting ridge P3 (as referred to FIG. 12). When the preform P is to be assembled with the holding jig 6, the mouth cylinder portion P2 is inserted with the helical ridge formed on its outer circumference being sliding on the side face of the generally central portion of the straight portion 32 of the C-shaped spring 31. However, the flattened portion 36 of the metal member has the sliding face formed into the elliptical sectional shape so that the metal wire member can achieve the insertion smoothly without being caught by the helical groove.

The posture of the preform P can be reliably held by the holding jig support portion K of the present invention. It is, therefore, not always necessary unlike the example (as referred to FIG. 14) of the prior art to provide the guide cylinder member 10 on the inner side of the preform P for holding the posture of the same. As has been described in connection with the first embodiment, however, the flow passage of the blow air can be accordingly enlarged substantially to the limit. In the construction of the present invention, it is naturally one of options to use the guide cylinder member 10 according to the mode of using the holding jig and the necessities in the manufacture process, the manufacture apparatus and so on.

Here, the present fifth embodiment is constructed by erecting the guide cylinder member 10. By making use of the tapered leading end portion of that guide cylinder member 10, the mouth cylinder portion P2 of the preform P can be easily and smoothly assembled with the leading end portion of the jig body 6. It is possible to relax the precision for positioning the holding jig transfer apparatus, for example, and to reduce the production troubles more.

Here, the double blow molding is executed by using the holding jig of the present fifth embodiment to mold the bottle. A secondary intermediate molding is not always fixed in its shape due to the thermal shrinkage and it is made slightly smaller in its size than that of the final molding. But the secondary intermediate molding can be inhibited in its rocking motion and held in a predetermined posture, therefore, at the blow molding step the frequency of occurrence such as the contact with the bottle or the bite by the split mold could be reduced to suppress the percent defective to a remarkably low level.

Figure 13:
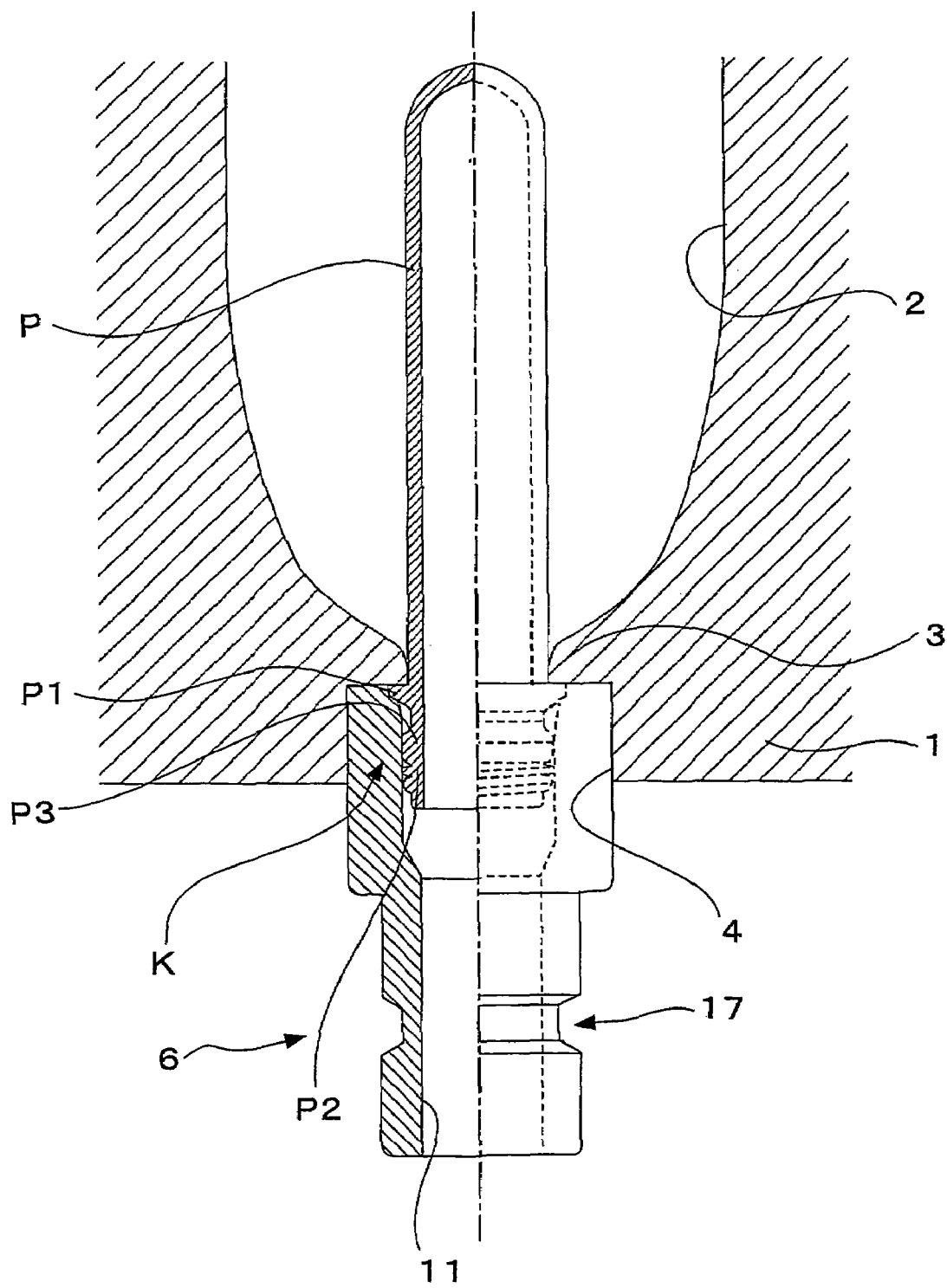
FIG. 13 is a front elevation showing the state, in which a sixth embodiment of present invention is mounted in a blow mold, with one lefthand half being presented in a longitudinal section.

FIG. 13 shows a sixth embodiment of the present invention, in which the support portion K is omitted from the first embodiment but in which the leading end portion of the jig body 6 is formed into a cylindrical shape having an internal diameter to make loose, external contact with the mouth cylinder portion P2. The jig body 6 can hold at least the posture of the preform P, in which the preform P is inverted and inserted in the jig body 6.

The fitted cylinder portion 9 has such an internal diameter at its upper portion as can make gentle, external contact with the peripheral projecting ridge P3 to insert the mouth cylinder portion P2 easily thereinto and as is radially enlarged upward in a gently counter-tapered shape. However, the internal diameter and the tapered shape can be selected considering the balance of the inserting and extracting properties of the mouth cylinder portion P2 into the jig body 6 and the holdability of the posture.

Even in case the support portion K is not adopted as in the present embodiment, moreover, with the jig body 6 being attached to the blow mold 1, the neck ring P1 can be reliably clamped between the abutting step portion 13 and the neck supporting flanged portion 3 of the blow mold 1 thereby to suppress the rocking motion of the preform P being blown.

ADVANTAGE OF THE INVENTION

The present invention has the construction thus far described so that it can have the following effects. In the invention as set forth in Claim 1, the assembled postures of the preform and the blow molding can be reliably held, even when the molding jig is detached from the blow mold, to prevent the occurrence of production troubles, as might otherwise be caused by losing the posture during the transfer, and the deflection of the posture of the secondary intermediate being heated in the double blow molding can be eliminated to prevent the defective phenomenon such as the bite of the mold.

Thanks to the construction in which the preform holds its position by making external contact with the mouth cylinder portion, moreover, the flow rate of the blow air can be increased to the excellent moldability and high productivity of a biaxial orientation blow-molded bottle.

In the invention as set forth in Claim 2, the O-ring supports the preform by making external contact with the entire outer circumference of the peripheral projecting ridge of the mouth cylinder portion so that the posture of the preform can be held properly and stably by the simple structure.

In the invention as set forth in Claim 3, the posture of the preform can be held properly and stably by the elastic force of the holder spring, as set to a desired value.

In the invention as set forth in Claim 4, the mouth cylinder portion is supported at a plurality of points positioned at the substantially equally spaced central angles, without making external contact with the entire outer circumference of the peripheral projecting ridge. Therefore, the attachment and detachment of the preform can be achieved smoothly and reliably with a low resistance to the insertion and extraction.

In the invention as set forth in Claim 5, the mouth cylinder portion is supported at the three points positioned at the substantially equally spaced central angles so that the deflection of the posture can be reliably suppressed. Because of this small number of supporting points, moreover, the resistance to the insertion and extraction can be so low that the attachment and detachment of the preform can be achieved smoothly and reliably.

In the invention as set forth in Claim 6, the holder spring has the simple shape which is formed of the generally C-shaped metal wire member, so that the three-point support can be reliably achieved. The holder spring can have easy attachment and detachment and an excellent durability and can be freed of such a problem that it is brought away from the inner circumference groove by the attachment and detachment of the preform. A high productivity can be achieved while simplifying the maintenance.

In the invention as set forth in Claim 7, the mouth cylinder portion of the preform is inserted with the helical ridge formed on the outer circumference being sliding on the generally central portions of the straight portions of the holder spring. The sliding face is exemplified by the flattened portion of the metal member having the elliptical section so that the inserting operation of the preform can be smoothly achieved with the wire-shaped metal member being not caught by the groove of the helical ridge.

In the invention as set forth in Claim 8, the ball members can act to hold the posture of the preform stably and to insert and extract the mouth cylinder portion of the preform smoothly and safely.

In the invention as set forth in Claim 9, the preform can be supported by the neck ring, too, so that the holding of its posture and the suppression of its rocking motion can be more reliably achieved.

Moreover, the sealing against the blow air can be achieved by the neck ring so that the blow pressure can act homogeneously on the entire surface of the mouth cylinder portion to prevent the occurrence of the defective deformation such as the radially enlarged deformation of the mouth cylinder portion.

In the invention as set forth in Claim 10, the holding jig is constructed by clearing the pin inserting bore of the jig body for the passage to feed the air to the inside of the mouth cylinder portion and the inside of the preform, of the portion which obstructs the flow of air into the preform. With the preform being stably held, the passage of air can be widened to the limit so that the air flow rate can be increased to shorten the blow time period and to improve the cooling efficiency at the air circulation time thereby to achieve an improvement in the productivity.

In the invention as set forth in Claim 11, the preform can be easily assembled with the holding jig by using the leading end portion of the guide cylinder member radially reduced in the tapered shape, as the guide. It is, therefore, possible to increase the degree of freedom of the precision design such as the positioning of the holding jig transfer apparatus and to reduce the production troubles thereby to improve the productivity.

In the invention as set forth in Claim 12, even with a resistance by the support portion when the blow molded bottle is extracted from the holding jig, the jig body is reliably fixed on the transfer apparatus by using the retained portion so that it is not raised together to prevent the troubles in the production.

In the invention as set forth in Claim 13, the holding jig is constructed by clearing the pin inserting bore of the jig body for the passage to feed the air to the inside of the mouth cylinder portion and the inside of the preform, of the portion which obstructs the flow of air into the preform. With the preform being stably held, the passage of air can be widened to the limit so that the air flow rate can be increased to shorten the blow time period and to improve the cooling efficiency at the air circulation time thereby to achieve an improvement in the productivity.

Moreover, the inner circumference of the leading end portion of the holding jig makes loose, external contact with the mouth cylinder portion of the preform. When at least the preform is erected upside-down and inserted in the jig body, its posture can be held, and its mouth cylinder portion can be easily inserted into and extracted from the leading end portion of the jig body.

In the invention as set forth in Claim 14, the preform can be supported by the portion of the neck ring, too, so that the holding of its posture and the suppression of its rocking motion can be more reliably achieved.

Moreover, the sealing against the blow air can be achieved by the neck ring so that the blow pressure can act homogeneously on the entire surface of the mouth cylinder portion to prevent the occurrence of the defective deformation such as the radially enlarged deformation of the mouth cylinder portion.

In the invention as set forth in Claim 15, even with a resistance when the blow molded bottle is extracted from the holding jig, the jig body is reliably fixed on the transfer apparatus by using the retained portion so that it is not raised together to prevent the troubles in the production.

The invention claimed is:

1. A preform holding jig for biaxial orientation blow-molding, comprising:
    a support portion holding an assembled posture of a preform having a bottomed cylindrical shape formed by a synthetic resin which is assembled by inserting a mouth cylinder portion, until an insertion limit, into a leading end portion of a cylindrical jig body in which a pin inserting bore is formed in a center for inserting a drawing pin herein;
    said support portion is disposed in an inner circumference of the leading end portion of said jig body at a position opposed to a peripheral projecting ridge of said mouth cylinder portion, and for making external contact with an outer circumference of said peripheral projecting ridge as to be capable of inserting and extracting said mouth cylinder portion; and
    an O-ring assembled and fixed in an inner circumference groove formed in the inner circumference of the leading end portion of said jig body, thereby to construct said support portion.

2. A preform holding jig for biaxial orientation blow-molding, comprising:
    a support portion holding an assembled posture of a preform having a bottomed cylindrical shape formed by a synthetic resin which is assembled by inserting a mouth cylinder portion, until an insertion limit, into a leading end portion of a cylindrical jig body in which a pin inserting bore is formed in a center for inserting a drawing pin herein;
    said support portion is disposed in an inner circumference of the leading end portion of said jig body at a position opposed to a peripheral projecting ridge of said mouth cylinder portion, and for making external contact with an outer circumference of said peripheral projecting ridge as to be capable of inserting and extracting said mouth cylinder portion; and
    a holder spring assembled and fixed in an inner circumference groove formed in the inner circumference of the leading end portion of said jig body, thereby to construct said support portion.

3. A preform holding jig for biaxial orientation blow-molding, as set forth in claim 2, wherein the holder spring makes external contact with the outer circumference of the peripheral projecting ridge of the preform at a plurality of points positioned at substantially equally spaced central angles.

4. A preform holding jig for biaxial orientation blow-molding, as set forth in claim 3, wherein the holder spring makes external contact with the outer circumference of the peripheral projecting ridge of the preform at three points positioned at substantially equally spaced central angles.

5. A preform holding jig for biaxial orientation blow-molding, as set forth in claim 4, wherein the holder spring is made of a wire-shaped metal member and is generally C-shaped to include three straight portions positioned at the substantially equally spaced central angles, and two curved portions connecting the adjoining ones of said straight portions, so that the substantially central portions of said straight portions make external contact with the outer circumference of said peripheral projecting ridge.

6. A preform holding jig for biaxial orientation blow-molding, as set forth in claim 5, wherein the metal member is formed to have such an elliptical section that a flattened portion makes external contact with the outer circumference of the peripheral projecting ridge.

7. A preform holding jig for biaxial orientation blow-molding, comprising:
a support portion holding an assembled posture of a preform having a bottomed cylindrical shape formed by a synthetic resin which is assembled by inserting a mouth cylinder portion, until an insertion limit, into a leading end portion of a cylindrical jig body in which a pin inserting bore is formed in a center for inserting a drawing pin herein;
said support portion is disposed in an inner circumference of the leading end portion of said jig body at a position opposed to a peripheral projecting ridge of said mouth cylinder portion, and for making external contact with an outer circumference of said peripheral projecting ridge as to be capable of inserting and extracting said mouth cylinder portion; and
said support portion is constructed: by mounting smoothly surfaced ball members in circular transverse holes formed in at least three portions at substantially equally spaced central angles with respect to the center axis of said jig body, such that they may be unable to come out and such that they are partially protruded in a pushed state by elastic members; and by providing seal portions in said transverse holes for exhibiting sealing properties against blow air.

8. A preform holding jig for biaxial orientation blow-molding, as set forth in claim 1, wherein a neck ring formed integrally with and circumferentially of the lower end of an outer circumference of the mouth cylinder portion is made, with the jig body being attached to the blow mold, to make close abutment against an abutting step portion formed at a leading end open edge portion of said jig body.

9. A preform holding jig for biaxial orientation blow-molding, as set forth in claim 1, wherein with the mouth cylinder portion of the preform being inserted to the insertion limit into the leading end portion of the jig body thereby to hold posture of said preform, all the construction portions are spaced by at least one half of an internal diameter of said mouth cylinder portion from a center axis of said preform.

10. A preform holding jig for biaxial orientation blow-molding, as set forth in claim 1, wherein with a guide cylinder member having a leading end portion radially reduced in a tapered shape and adapted to be inserted into the mouth cylinder portion of the preform is so erected into the pin inserting bore that the leading end portion of the guide cylinder member is protruded from the leading end of the jig body.

11. A preform holding jig for biaxial orientation blow-molding, as set forth in claim 1, wherein a retained portion to be retained in an unextractable manner in a transfer apparatus is provided in outer circumference of a root end portion of the jig body.

12. A preform holding jig for biaxial orientation blow-molding, as set forth in claim 2, wherein a neck ring formed integrally with and circumferentially of a lower end of an outer circumference of the mouth cylinder portion is made, with the jig body being attached to the blow mold, to make close abutment against an abutting step portion formed at a leading end open edge portion of said jig body.

13. A preform holding jig for biaxial orientation blow-molding, as set forth in claim 2, wherein with the mouth cylinder portion of the preform being inserted to the insertion limit into the leading end portion of the jig body thereby to hold a posture of said preform, all construction portions are spaced by at least one half of an internal diameter of said mouth cylinder portion from a center axis of said preform.

14. A preform holding jig for biaxial orientation blow-molding, as set forth in claim 2, wherein with a guide cylinder member having a leading end portion radially reduced in a tapered shape and adapted to be inserted into the mouth cylinder portion of the preform is so erected into the pin inserting bore that the leading end portion of the guide cylinder member is protruded from the leading end of the jig body.

15. A preform holding jig for biaxial orientation blow-molding, as set forth in claim 2, wherein a retained portion to be retained in an unextractable manner in a transfer apparatus is provided in an outer circumference of a root end portion of the jig body.

16. A preform holding jig for biaxial orientation blow-molding, as set forth in claim 7, wherein a neck ring formed integrally with and circumferentially of a lower end of an outer circumference of the mouth cylinder portion is made, with the jig body being attached to the blow mold, to make close abutment against an abutting step portion formed at a leading end open edge portion of said jig body.

17. A preform holding jig for biaxial orientation blow-molding, as set forth in claim 7, wherein with the mouth cylinder portion of the preform being inserted to the insertion limit into the leading end portion of the jig body thereby to hold a posture of said preform, all construction portions are spaced by at least one half of an internal diameter of said mouth cylinder portion from a center axis of said preform.

18. A preform holding jig for biaxial orientation blow-molding, as set forth in claim 7, wherein with a guide cylinder member having a leading end portion radially reduced in a tapered shape and adapted to be inserted into the mouth cylinder portion of the preform is so erected into the pin inserting bore that the leading end portion of the guide cylinder member is protruded from the leading end of the jig body.

19. A preform holding jig for biaxial orientation blow-molding, as set forth in claim 7, wherein a retained portion to be retained in an unextractable manner in a transfer apparatus is provided in an outer circumference of a root end portion of the jig body.

20. A preform holding jig for biaxial orientation blow-molding, as set forth in claim 4, wherein a neck ring formed integrally with and circumferentially of the lower end of an outer circumference of the mouth cylinder portion is made, with the jig body being attached to the blow mold, to make close abutment against an abutting step portion formed at a leading end open edge portion of said jig body.

21. A preform holding jig for biaxial orientation blow-molding, as set forth in claim 4, wherein with the mouth cylinder portion of the preform being inserted to the insertion limit into the leading end portion of the jig body thereby to hold a posture of said perform, all the construction portions are spaced by at least one half of an internal diameter of said mouth cylinder portion from a center axis of said perform.

* * * * *